Patented July 19, 1938

2,124,218

UNITED STATES PATENT OFFICE 2,124,218

PROCESS FOR THE MANUFACTURE OF DIIODOACETYLENE

Thomas H. Vaughn, Niagara Falls, N. Y., assignor, by mesne assignments, to Union Carbide and Carbon Corporation, a corporation of New York No Drawing. Application May 16, 1935, Serial No. 21,813

14 Claims. (Cl. 260—162)

The present invention relates to the iodination in liquid ammonia of disubstituted acetylides; and more especially it concerns the production of diiodoacetylene by reacting a disubstituted acetylide with iodine in the presence of liquid ammonia.

Heretofore, processes have been employed for the manufacture, on a laboratory scale, of diiodoacetylene by reacting together pure acetylene and iodine in the presence of liquid ammonia. Acetylene of a high degree of purity was used; and this acetylene first was washed with water and was then dried by spraying it through concentrated sulfuric acid. The pure acetylene then was bubbled through iodine dissolved in liquid ammonia. Similar processes employing a monosubstituted acetylide such as sodium acetylide in place of pure acetylene also have been used, the acetylide previously being prepared by reacting pure acetylene and metallic sodium in liquid ammonia. Obviously, such processes essentially involve the use of expensive starting materials and are not suitable for the commercial manufacture of diiodoacetylene.

Diiodoacetylene also has been produced in small amounts in the laboratory by reacting upon an aqueous solution of iodine in potassium iodide with small portions of calcium carbide at atmospheric pressure and temperature. Under these conditions, however, much of the calcium carbide reacts with the water to form acetylene and calcium hydroxide; and the latter then unites with the free iodine to form calcium iodide and calcium iodate, thus preventing the major portion of the iodine from forming the desired diiodoacetylene.

The present invention is based in important part upon the discovery that diiodoacetylene can be manufactured with higher yields than those obtained in the said prior processes, by reacting together certain relatively inexpensive starting materials, any impurities normally present in which do not deleteriously affect the course of the reaction or the yield and purity of the diiodoacetylene thus produced.

Among the more important objects of the invention therefore are: The production of diiodoacetylene, employing relatively inexpensive starting materials; the production from such starting materials of diiodoacetylene of a high degree of purity; and the production in novel manner of diiodoacetylene from dry starting materials other than acetylene or a compound which requires pure acetylene for its manufacture.

In the practice of the present invention for the production of diiodoacetylene, a disubstituted acetylide, such as calcium carbide or other alkali or alkaline earth carbides, or a mixture thereof, is reacted with iodine in non-aqueous or liquid ammonia. This reaction may be conducted at a wide range of temperatures and pressures. For example, at —34° C.,—the boiling point of liquid ammonia under atmospheric pressure,—the reaction is completed in a relatively short time, considerably less than two hours. A major portion of the reaction apparently requires a much shorter period, in the neighborhood of fifteen minutes. At higher temperatures, however,—say temperatures around 25° C., and corresponding pressures which in such case may range as high as 150 pounds per sq. in.,—the reaction proceeds much more rapidly and the iodine quickly is consumed. Where calcium carbide is the disubstituted acetylide employed, and is added to a solution of iodine in liquid ammonia, diiodoacetylene is formed in accordance with either or both of the following equations:

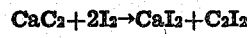

Upon completion of the above-mentioned reaction, water or suitable aqueous solution is added to the mixture; and the same is filtered. The resulting filter cake contains diiodoacetylene and calcium hydroxide, together with certain impurities present in the carbide employed as starting material.

For recovering the diiodoacetylene from the filter cake, the latter may be washed or leached with a suitable solvent for this compound. The resultant solution contains the diiodoacetylene; and the residue contains the undesired products, such as small amounts of calcium compounds and carbon present in the filter cake.

The diiodoacetylene is recoverable from this solution in suitable manner. For instance, the solvent may be completely evaporated from the said solution, in which case it is desirable to employ a low-boiling solvent, such as butane, petroleum ether boiling at between 30° and 60° C., and other low-boiling aliphatic hydrocarbons; and low-boiling ethers, such as dimethyl and diethyl ether.

The diiodoacetylene may be recovered from the solution by partial evaporation of the solvent and the subsequent cooling of the resultant concentrated solution, thereby effecting crystallization of the desired compound. Preferably, where crystallization is to be effected, it is advisable, although not necessary, to use a somewhat higher-boiling solvent than would be used where recovery of the diiodoacetylene is to be effected by complete removal of the solvent. Such a solvent is the petroleum ether boiling at between 60° and 100° C. The crystallization readily may be accomplished by cooling the petroleum ether to around −30° C. by immersion in liquid ammonia.

An alcohol such as ethyl or isopropyl alcohol may be employed as a leaching agent for the filter cake. The alcohol dissolves the diiodoacetylene and makes possible a very effective recovery of the latter, leaving behind the calcium compounds and carbon of the filter cake. The diiodoacetylene then is recoverable from the alcohol by the addition of water, which causes its precipitation.

The precipitated diiodoacetylene may be used for some purposes in a wet condition; or it may be dried at temperatures which are not sufficiently high,—above atmospheric temperature,—to cause active decomposition thereof; or the diiodoacetylene may be crystallized from a suitable solvent having a low degree of solubility for water,—such as petroleum ether.

In instances where the impurities in the filter cake are mainly of a basic nature, purification of the diiodoacetylene may be effected by washing the filter cake with dilute hydrochloric acid, preferably at room temperature or below, at which temperatures this treatment does not cause an appreciable decomposition of the diiodoacetylene but does remove the major portion of the impurities. The material subsequently may be washed with water, after which it may be crystallized from a solution thereof in a solvent, or it may be dried in the usual manner.

The following example serves to illustrate the present invention:

One mol. of calcium carbide was placed in one liter of liquid ammonia at atmospheric pressure and at a temperature of approximately −34° C. To this solution two mols of iodine was added, while vigorously stirring the solution. The stirring was continued for about two hours. Following the reaction, water was added to the mixture and the reaction product was filtered, employing suction. The resultant filter cake containing diiodoacetylene, together with calcium hydroxide and other substances, was then leached with butane. The butane solution containing the diiodoacetylene then was evaporated, leaving behind the latter as solid residue.

Where desired, the solution of diiodoacetylene in the solvent may be treated with calcium chloride or other drying agent for dehydration purposes, following which the solution is decanted or filtered prior to the treatment for the recovery of the diiodoacetylene. Other well known methods for drying this compound may be employed.

Low-boiling petroleum ethers are effectively employed as solvents, for the removal of diiodoacetylene from the filter cake, particularly where the compound subsequently is crystallized from the resulting solution. This crystallization generally is accomplished by cooling the petroleum ether or its equivalent to about −30° to −40° C. by immersion in liquid ammonia. High-boiling solvents, in general, offer no particular advantage for use with the invention, due to the tendency of diiodoacetylene to decompose at temperatures slightly above atmospheric temperature.

By the practice of the present invention it is now possible to synthesize diiodoacetylene by a process which gives higher yields of this compound than those which are practically obtainable from aqueous processes and those employing acetylene or a mono-substituted acetylide as a starting material,—while avoiding the expenses incidental to the generation and purification of acetylene or of a mono-substituted acetylide. The impurities present in the starting materials used are readily and completely removable in the process, whereby the final product is secured in a pure form.

The liquid ammonia preferably employed in the practice of the invention is substantially anhydrous; although it will be understood that ammonia containing small amounts of moisture may be employed.

The invention is susceptible of modification within the scope of the appended claims.

I claim:

1. The process of producing diiodoacetylene, which comprises the step of reacting a metal carbide with iodine in liquid ammonia, the said carbide being selected from the group consisting of the alkali metal carbides and the alkaline earth metal carbides.

2. The process of producing diiodoacetylene, which comprises the step of reacting an alkali metal carbide with iodine in liquid ammonia.

3. The process of producing diiodoacetylene, which comprises the step of reacting an alkaline earth metal carbide with iodine in liquid ammonia.

4. The process of producing diiodoacetylene, which comprises the step of reacting calcium carbide with iodine in liquid ammonia.

5. The process of producing diiodoacetylene, which comprises reacting a metal carbide with iodine in liquid ammonia at a temperature not substantially above atmospheric temperature, the said carbide being selected from the group consisting of the alkali metal carbides and the alkaline earth metal carbides.

6. The process of producing diiodoacetylene, which comprises the step of reacting a metal carbide with iodine in liquid ammonia, the said carbide being selected from the group consisting of the alkali metal carbides and the alkaline earth metal carbides, precipitating the diiodoacetylene thus produced, and separating the latter from the reaction mixture.

7. The process of producing diiodoacetylene, which comprises the step of reacting an alkaline earth metal carbide with iodine in liquid ammonia, precipitating the diiodoacetylene thus produced, and separating the latter from the reaction mixture.

8. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, washing the resultant filter cake with a solvent for diiodoacetylene, and recovering the diiodoacetylene from the resultant solution.

9. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, washing the resultant filter cake with a low-boiling solvent for diiodoacetylene, and recovering the diiodoacetylene from the resultant solution.

10. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, washing the resultant filter cake with a low-boiling ether, and recovering the diiodoacetylene from the resultant solution.

11. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, leaching the resultant filter cake with an alcohol, separating the alcoholic solution of diiodoacetylene from the filter cake, adding water to the alcoholic solution thereby precipitating the diiodoacetylene, and drying the latter.

12. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, washing the resultant filter cake with a low-boiling solvent for diiodoacetylene, and evaporating from the resultant solution at least part of the said solvent.

13. The process of producing diiodoacetylene, which comprises reacting a metal carbide with iodine in liquid ammonia, the said carbide being selected from the group consisting of the alkali metal carbides and the alkaline earth metal carbides, precipitating the diiodoacetylene thus produced, filtering the mixture, washing the resultant filter cake with a low-boiling solvent for diiodoacetylene, concentrating the resultant solution by evaporation of the solvent, and crystallizing the diiodoacetylene from the resultant concentrated solution.

14. The process of producing diiodoacetylene, which comprises reacting a metal carbide with iodine in liquid ammonia, the said carbide being selected from the group consisting of the alkali metal carbides and the alkaline earth metal carbides, precipitating with water the diiodoacetylene thus produced, filtering the mixture, washing the resultant filter cake with a dilute mineral acid at a temperature not substantially above room temperature, thereby removing impurities present, and recovering the diiodoacetylene which remains.

THOMAS H. VAUGHN.